US009071691B2

(12) United States Patent
Feng

(10) Patent No.: US 9,071,691 B2
(45) Date of Patent: Jun. 30, 2015

(54) APPARATUS AND VOICE CALL AUTO-REDIALING AND TRANSFERRING METHOD

(71) Applicants: AMBIT MICROSYSTEMS (SHANGHAI) LTD., Shanghai (CN); HON HAI PRECISION INDUSTRY CO., LTD., New Taipei (TW)

(72) Inventor: Xing Feng, Shanghai (CN)

(73) Assignees: AMBIT MICROSYSTEMS (SHANGHAI) LTD., Shanghai (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/048,039

(22) Filed: Oct. 8, 2013

(65) Prior Publication Data

US 2014/0119528 A1 May 1, 2014

(30) Foreign Application Priority Data

Oct. 26, 2012 (CN) .......................... 2012 1 04157629

(51) Int. Cl.
*H04M 3/54* (2006.01)
*H04M 3/424* (2006.01)
*H04M 3/58* (2006.01)

(52) U.S. Cl.
CPC ................ *H04M 3/54* (2013.01); *H04M 3/424* (2013.01); *H04M 3/58* (2013.01)

(58) Field of Classification Search
CPC .......... H04M 3/424; H04M 3/54; H04M 3/58
USPC ............. 379/201.01, 201.02, 207.01, 209.01, 379/210.01, 212.01; 455/414.1, 417
See application file for complete search history.

(56) References Cited

U.S. PATENT DOCUMENTS

| 7,822,186 | B1 * | 10/2010 | Boni ......................... 379/210.01 |
| 8,233,611 | B1 * | 7/2012 | Zettner .................... 379/266.07 |
| 2004/0266405 | A1 * | 12/2004 | Benco et al. ............... 455/414.1 |
| 2005/0014521 | A1 * | 1/2005 | Kramarz-Von Kohout .. 455/510 |
| 2008/0069330 | A1 * | 3/2008 | Burckart et al. ......... 379/210.01 |
| 2010/0291928 | A1 * | 11/2010 | Valdez ........................... 455/436 |
| 2013/0115932 | A1 * | 5/2013 | Williams et al. .............. 455/417 |

* cited by examiner

*Primary Examiner* — Harry S Hong
(74) *Attorney, Agent, or Firm* — Novak Druce Connolly Bove + Quigg LLP

(57) ABSTRACT

A customer premise equipment (CPE) establishes voice calls between a first and second voice communication devices. When establishment of a voice call between the first and second voice communication devices fails, the CPE auto-redials the second voice communication device at predetermined time intervals. When the second voice communication device answers the redialing, the voice call between the first and second voice communication devices is established and is transferred to a preset third voice communication device.

10 Claims, 4 Drawing Sheets

APPARATUS AND VOICE CALL AUTO-REDIALING AND TRANSFERRING METHOD

BACKGROUND

1. Technical Field

Embodiments of the present disclosure relate to networking voice communications, and particularly to an apparatus and a voice call auto-redialing and transferring method.

2. Description of Related Art

Voice over Internet protocol (VoIP) technologies are widely used for provision of communication services over the public Internet, rather than via the public switched telephone network (PSTN). A user can use a computer, which is installed with a voice call application, to establish a voice call based on VoIP. When the callee is busy on line, the caller may need to wait at the computer and redial the callee until the voice call is established, which is inconvenient. Therefore, there is room for improvement in the art.

DETAILED DESCRIPTION

The disclosure, including the accompanying drawings, is illustrated by way of example and not by way of limitation. It should be noted that references to "an" or "one" embodiment in this disclosure are not necessarily to the same embodiment, and such references mean "at least one."

Figure 1:
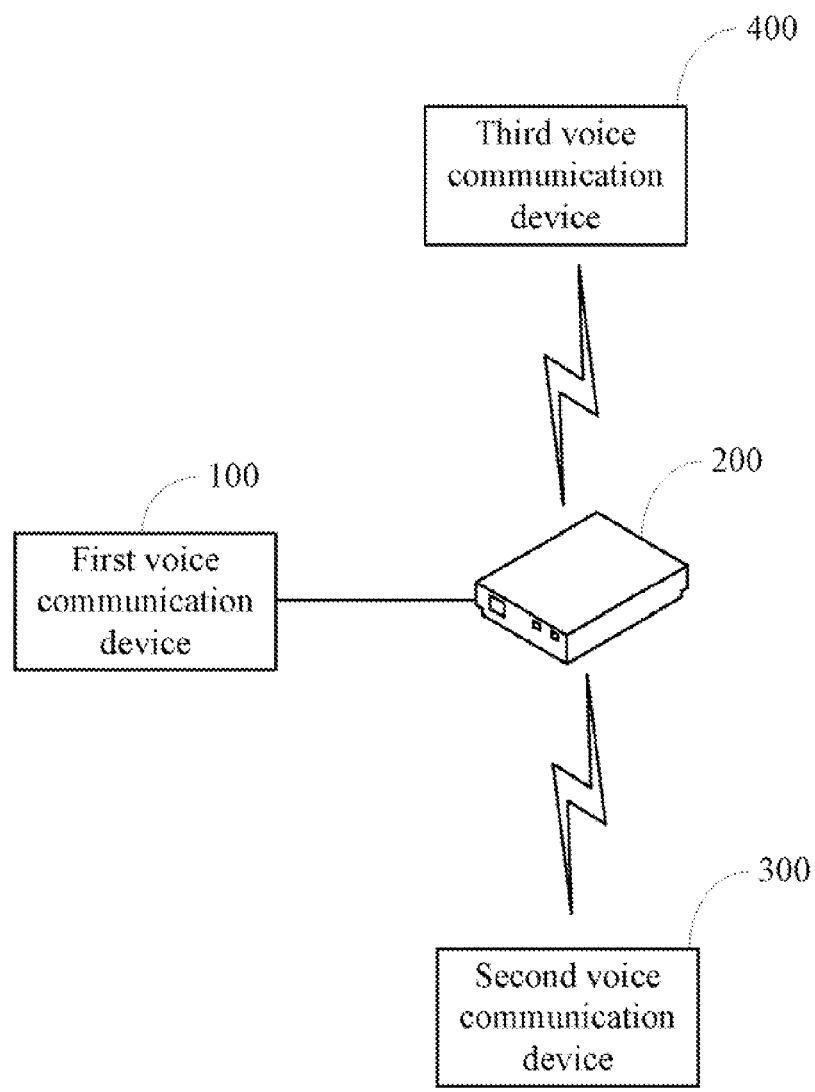
FIG. 1 is a schematic diagram illustrating one embodiment of a customer premise equipment (CPE) used to establish a communication between a first voice communication device and a second voice communication device through a network.

FIG. 1 is a schematic diagram illustrating one embodiment of a customer premise equipment (CPE) 200 used to establish a communication between a first voice communication device 100 and a second voice communication device 300. In the embodiment, the CPE 200 is connected to the first voice communication device 100 via a wired connection (e.g., via cable line or data line) or via a wireless connection (e.g., via BLUETOOTH or WIFI). The CPE 200 may establish the communication between the first voice communication device 100 and the second voice communication device 300 via a network (not shown).

In the illustrated embodiment, the CPE 200 may be, for example, a modem, a media gateway controller which uses media gateway control protocol (MGCP), or other similar devices. The first voice communication device 100 may be a computer or a fixed telephone, which has a network voice communication function. The second voice communication device 300 may be, for example, a mobile phone, or other voice communication terminals same as the first voice communication device 100. The CPE 200 may establish the communication between the first voice communication device 100 and the second voice communication device 300 via world interoperability for microwave access (WIMAX) network, a second generation (2G) network, a third generation (3G) network, or other similar wireless communication networks. It should be understood that another CPE (not shown) can be used to connect between the second voice communication device 300 and the network.

Figure 2:
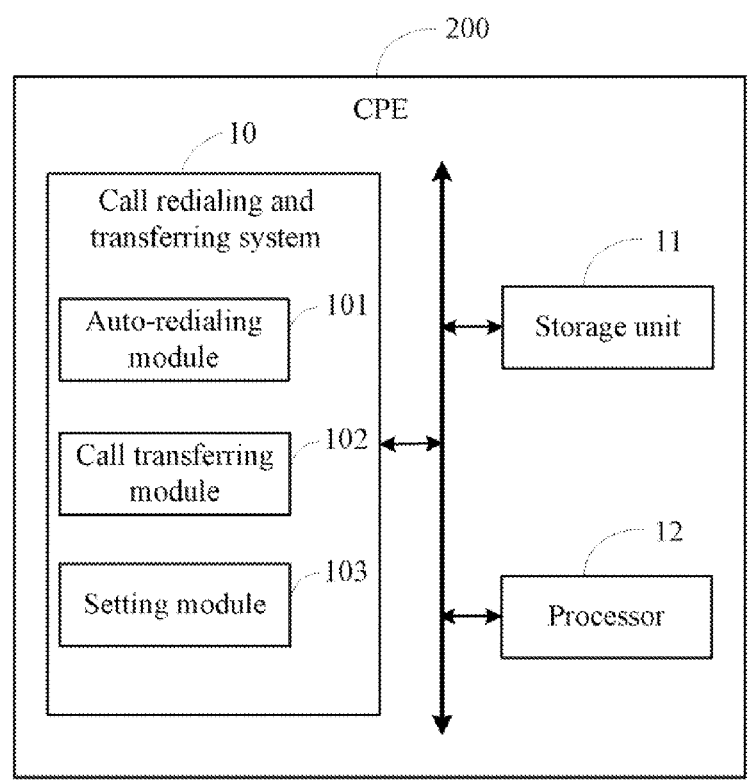
FIG. 2 is a schematic block diagram of the CPE of FIG. 1 including a plurality of functional modules.

FIG. 2 is a schematic block diagram of the CPE 200 of FIG. 1. The CPE 200 includes a storage unit 11, a processor 12, and a call redialing and transferring system 10 having a plurality of functional modules. Each of the functional modules may include a plurality of programs in the form of one or more computerized instructions stored in the storage unit 11 and executed by the processor 12 to perform operations of the customer premise equipment 200. In the embodiment, the call redialing and transferring system 10 includes a auto-redialing module 101, a call transferring module 102, and a setting module 103.

In general, the word "module", as used herein, refers to logic embodied in hardware or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or hardware modules and may be stored in any type of non-transitory computer-readable medium or other storage devices. Some non-limiting examples of non-transitory computer-readable medium include CDs, DVDs, BLU-RAY, flash memory, and hard disk drives.

The auto-redialing module 101 redials the second voice communication device 300 at predetermined time intervals (e.g., every 30 seconds) when establishment of a voice call between the first voice communication device 100 and the second voice communication device 200 fails, for example, when the second voice communication device 300 is busy on line. The auto-redialing module 101 further counts a number of redial times, and terminates the redialing when the number of redial times exceeds a predetermined number of times (e.g., 30 times). In the embodiment, the voice call is a VoIP voice call.

The call transferring module 102 establishes the voice call between the first and second voice communication devices 100, 300 and transfers the voice call to a preset third voice communication device 400, when the redialing of the second voice communication device 300 is answered. In the illustrated embodiment, the call transferring module 102 may first dial the third voice communication device 400, and then establish a three-way call among the first, second, and third voice communication devices to transfer the voice call to the third voice communication device 400 when the dialing of the third voice communication device 400 is answered. Thus, a user of the first voice communication device 100 can process the voice call between the first and second voice communication devices 100, 300 using the third voice communication device 400. In the illustrated embodiment, the third voice communication device 400 is a mobile communication device of the user, such as a mobile phone. Thus, the user only needs to take the third voice communication device 400 rather than wait at the first voice communication device 100 to speak to the second voice communication device 300.

Figure 4:
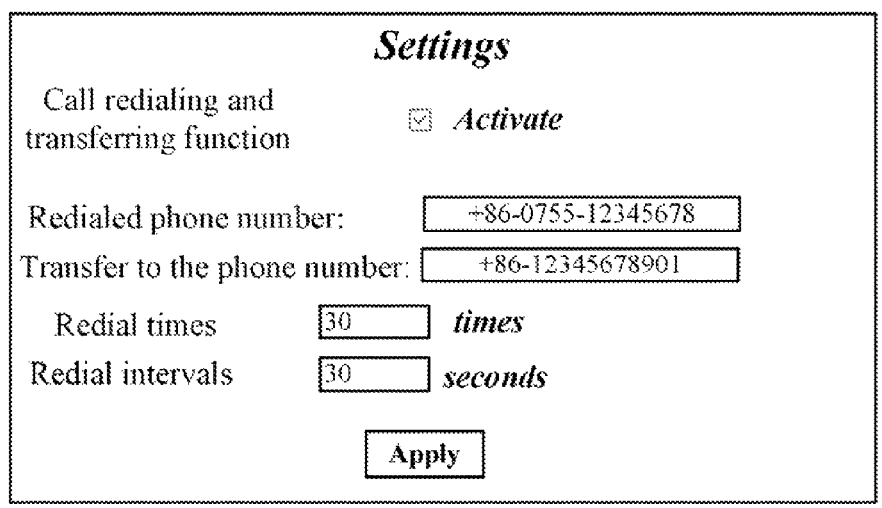
FIG. 4 is a schematic diagram illustrating a setting interface provided by the CPE.

In the illustrated embodiment, the setting module 103 is provided for the user to set identification (e.g., phone number) of the third voice communication device 400. Using the setting module 103 the predetermined number of times and the predetermined time intervals are preset. For facilitating operation, the setting module 103 may provide a setting interface to set the identification, the predetermined time intervals and the predetermined number of times. FIG. 4 shows a schematic view of the setting interface. The setting interface includes items of "redialed phone number", "transfer to the phone number", "redial times", and "redial interval", for example, which are respectively used to set a phone number of the second voice communication device 300, a phone number of the third voice communication device 400, the predetermined number of times, and the predetermined time intervals. The user can login to the setting interface using a browser (not shown) of the first voice communication device 100 according to a hyper text transfer protocol (http) address (e.g., 192.168.1.1) of the CPE 200. The setting interface further includes an option provided for the user to alternatively activate or disable the function of call automatic redialing and transferring. When the option is selected by the user, the function is activated, and the auto-redialing module 101 and the call transferring module are thus activated. Otherwise, if the option is not selected by the user, the function is disabled, and the auto-redialing module 101 and the call transferring module are thus disabled.

Figure 3:
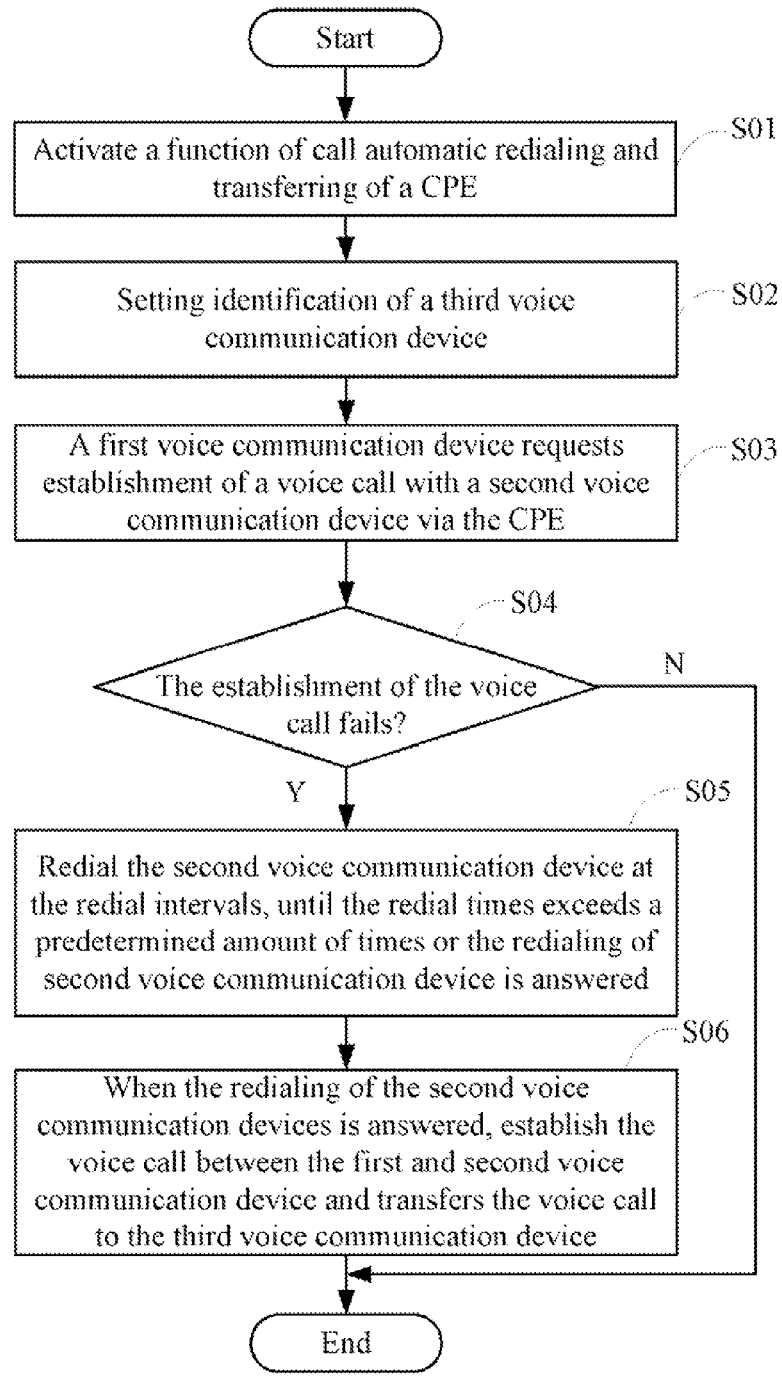
FIG. 3 is a flowchart of one embodiment of a voice call auto-redialing and transferring method implemented by the CPE of FIG. 1.

FIG. 3 shows a flowchart of one embodiment of a method for voice call automatic redialing and transferring by using the call redial and transferring system 10 of FIG. 2. Depending on the embodiment, additional steps may be added, others removed, and the ordering of the steps may be changed.

In step S01, activating the function of call automatic redialing and transferring of the CPE 200 using the setting module 103.

In step S02, identification of a third voice communication device 400 is set using the setting module 103.

In step S03, the first voice communication device 100 requests establishment of a voice call with the second voice communication device 300 via the CPE 200.

In step S04, the auto-redialing module 101 determines whether the establishment of the voice call fails. If the establishment of the voice call fails, step S05 is implemented. Otherwise, if the establishment of the voice call succeeds, the procedure ends.

In step S05, the auto-redialing module 101 redials the second voice communication device 300 at a predetermined time intervals, until the redial times exceeds a predetermined number of times or the redialing of second voice communication device 300 is answered.

In step S06, when the second voice communication devices 300 is answered, the call transferring module 102 establishes the voice call between the first and second voice communication devices 100, 300 and transfers the voice call to the third voice communication device 400.

Although certain embodiments of the present disclosure have been specifically described, the present disclosure is not to be construed as being limited thereto. Various changes or modifications may be made to the present disclosure without departing from the scope and spirit of the present disclosure.

What is claimed is:

1. A voice call auto-redialing and transferring method implemented by a processor of a customer premise equipment (CPE), the CPE connected to a first voice communication device, the method comprising:
    redialing a second voice communication device at predetermined time intervals, when establishment of a voice call between the first voice communication device and the second voice communication device fails;
    counting a number of redial times between the first voice communication device and the second voice communication device; and
    terminating the redialing of the second voice communication device when the redial times exceeds a predetermined number of times;
    establishing the voice call between the first and second voice communication devices;
    dialing a third voice communication device;
    establishing a three-way call among the first, second, and third voice communication devices when the dialing of the third voice communication device is answered; and
    transferring the voice call to the preset third voice communication device, when the redialing of the second voice communication device is answered.

2. The method according to claim 1, further comprising a setting step before the step of redialing a second voice communication device at predetermined time intervals, wherein the setting step comprises:
    setting identification of the third voice communication device, the predetermined time intervals, and the predetermined number of times.

3. The method according to claim 2, wherein the CPE provides a setting interface configured for setting the identification of the third voice communication device, the predetermined time intervals, and the predetermined number of times.

4. The method according to claim 3, wherein the CPE comprises a hyper text transfer protocol (http) address for a user to login to the setting interface.

5. The method according to claim 1, wherein the CPE is a modem or a media gateway controller.

6. A customer premise equipment (CPE) configured to establish a voice call between a first a first voice communication device and a second voice communication device, comprising:
    a processor; and
    a storage unit storing one or more programs, the one or more programs executed by the processor to:
        redial the second voice communication device at predetermined time intervals, when establishment of a voice call between the first voice communication device and the second voice communication device fails;
        count a number of redial times between the first voice communication device and the second voice communication device;
        terminate the redialing of the second voice communication device when the redial times exceeds a predetermined number of times;
        establish the voice call between the first and second voice communication devices;
        dial a third voice communication device;
        establish a three-way call among the first, second, and third voice communication devices when the dialing of the third voice communication device is answered; and
        transfer the voice call to the preset third voice communication device, when the redialing of the second voice communication device is answered.

7. The CPE according to claim 6, wherein the method further comprises a setting step before the step of redialing a second voice communication device at predetermined time intervals, wherein the setting step comprises:
    setting identification of the third voice communication device, the predetermined time intervals, and the predetermined number of times.

8. The CPE according to claim 7, wherein the CPE provides a setting interface configured for setting the identification of the third voice communication device, the predetermined time intervals, and the predetermined number of times.

9. The CPE according to claim 8, wherein the CPE comprises a hyper text transfer protocol (http) address for a user to login to the setting interface.

10. The CPE according to claim 6, wherein the CPE is a modem or a media gateway controller.

\* \* \* \* \*